Figure 1:
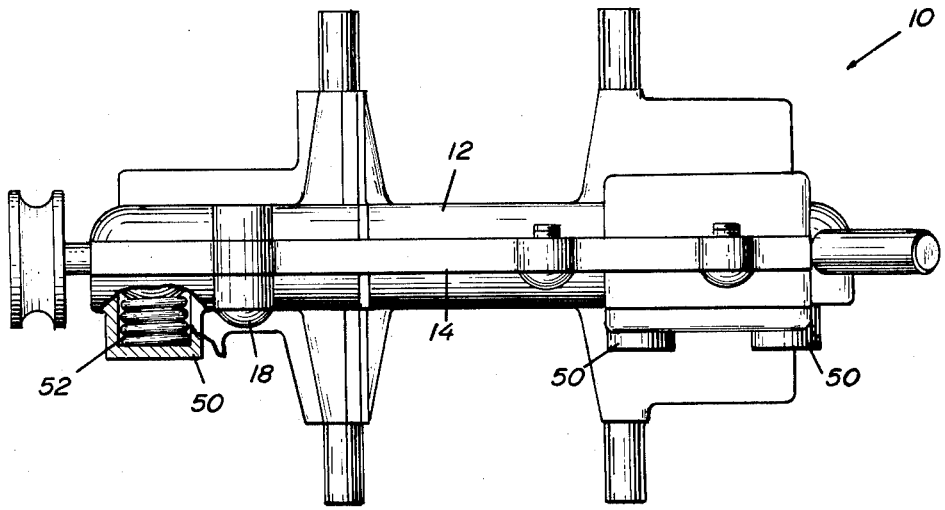

June 21, 1966   A. H. SMITH   3,256,746
GEAR REDUCING ASSEMBLY
Original Filed Dec. 3, 1963

Aaron H. Smith
INVENTOR

BY Jacobi & Davidson

ATTORNEYS

United States Patent Office 3,256,746
Patented June 21, 1966

3,256,746
GEAR REDUCING ASSEMBLY
Aaron H. Smith, Ipswich, Mass., assignor to Signal Manufacturing Company, a corporation of Massachusetts
Original application Dec. 3, 1963, Ser. No. 328,148, now Patent No. 3,189,933, dated June 22, 1965. Divided and this application June 9, 1964, Ser. No. 373,666
4 Claims. (Cl. 74—417)

This invention relates to a gear reducing assembly and more particularly it relates to an assembly having angularly disposed gear shafts therein whereby rotation of one of the shafts will cause a responsive rotation of the other of said shafts, but at a different rotational rate.

This application is a divisional application of my application Serial No. 328,148, now Pat. No. 3,189,933, filed December 3, 1963, which in turn was a continuation-in-part application of my application Serial No. 166,999, filed January 18, 1962.

The uses of gear reducing assemblies are well known to those skilled in the art and cover a wide variety of applications such as in the automotive, marine and general industrial fields. Such assemblies generally take the form of a casing having disposed therein, a set of angularly arranged bevel gears with an associated shaft projecting from each of the gears. Naturally, each shaft must be suitably supported by bearings to permit it to rotate freely as the bevel gears interact with one another. Thus, as one shaft is driven or rotated by a power source, it causes its attached bevel gear to rotate and to mesh with a mating bevel gear to rotate it and its attached shaft in the opposite rotational direction. Depending upon the arrangement of the gearing in such an assembly, the driven shaft will rotate either faster or slower than the driving shaft.

Of course, it will be appreciated that such gear reducing assemblies can be constructed in an almost infinite variety of sizes, shapes and speeds, but for each of such assemblies, there are certain fundamental considerations which are determined primarily by the use to which the assembly is to be put. For instance, an assembly designed for use in an aeronautical environment may have lightness of weight, as its prime consideration. An assembly designed for use in an automotive environment may have compactness as its prime consideration. An assembly designed for use in a machine tool may have accuracy and sensitivity as its prime consideration, and so on.

With the foregoing in mind, it is, therefore, a primary object of the present invention to provide a gear reducing assembly which is designed for universal or all-purpose use and hence can be suitably employed in any number of various applications.

Another primary object of the present invention is to provide an efficient means for translating the rotational motion of one member into a corresponding, oppositely directed and varied speed rotational motion of another member.

Further general, though equally significant, objects of the present invention include the provision of a gear reducing assembly which is: (a) rugged and durable; (b) compact; (c) capable of maintaining proper alignment of the component parts thereof; (d) inexpensive and relatively easy to manufacture; and (e) relatively simple in its nature and quickly disassemblable for maintenance or repair, if needed.

Other objects, advantages and salient features of the present invention will be apparent from the following detailed description, which, taken in connection with the annexed drawing discloses a preferred embodiment thereof.

Figure 2:
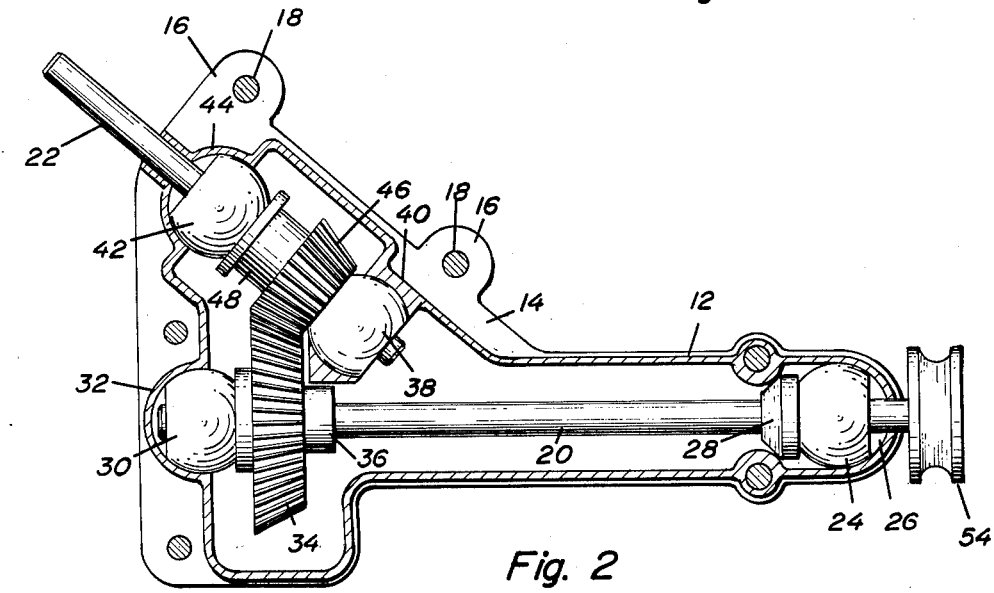

Referring to the drawing:
FIGURE 1 is a side elevational view of a gear reducing assembly in accordance with the principles of the present invention; and,
FIGURE 2 is a top plan view of the assembly of FIGURE 1, shown partially in section.

In the drawings, the gear reducing assembly is generally designated 10 and includes a housing or casing 12 having a suitable shape and having a peripheral flange 14 extending medially thereabout. The flange 14 is provided with spaced outwardly extending protuberances 16 through which suitable bolt means 18 can be inserted to attach the assembly 12 in its place of desired use.

Disposed within the housing in generally coplanar relation are a pair of shafts 20 and 22, having their axes extending angularly to one another to subtend therebetween, an acute angle. Each shaft is supported at its opposite ends within the housing by a pair of spherical or frusto-spherical self-aligning bearing members. Thus, at one end of the shaft 20, a bearing 24 is mounted to rotate within a socket 26 within the housing 12. A collar 28 can be pressed onto the shaft to engage the bearing 24 and assure that it stays aligned within its socket 26. At the other end of the shaft 20, a bearing 30 is mounted to rotate within a socket 32 in the housing. A bevel gear 34 is pressed onto the shaft adjacent the bearing 30 and a collar 36 assures that the gear stays tightly in place.

The shaft 22 is mounted similarly to the shaft 20 and, as such, has a bearing 38 at one end thereof riding in a housing socket 40 and a bearing 42 near its other end and riding in a housing socket 44. A bevel gear 46 is pressed onto the shaft 22 between the bearings and a spacer or collar 48 disposed between the gear 46 and the bearing 42 assures that the bearings remain properly housed within their associated sockets and that the gear 46 meshes properly with its mating gear 34.

Beneath each of bearings 24, 30, 38 and 42, a pocket is formed within the housing and each of these pockets is designated 50. Within each pocket 50, a compression spring 52 is mounted to bias against the bearings and to thus retain them in proper position.

One end of the shaft 20 projects beyond the housing 12 and has mounted thereon at its end, a pulley 54. One end of the shaft 22 likewise extends outside the housing and can thus be connected to any suitable driving means, such as an electric motor.

In operation, the shaft 22 is driven by a suitable power source to cause a rotation of its attached bevel gear 46. The rotating gear 46 meshes with and thereby rotates the bevel gear 34 in an opposite direction. Rotation of the gear 34 thus drives the shaft 20 to cause the pulley 54 to rotate and, in use, an endless belt would be reeved within the pulley and would be driven thereby. Since the gear 46 is somewhat smaller than the gear 34, the rotational speed of the shaft 22 becomes geared down and hence the shaft 20 does not rotate as fast as the shaft 22.

It will, of course, be understood that the pulley 43 can be eliminated if desired since it is only an exemplary expedient by which the rotational effect of the shaft 20 is utilized. Similarly, other obvious changes can be made, if desired. For instance, the gearing can be reversed so the shaft 20 is driven faster than the shaft 22. Alternatively, the shaft 20 may serve as the drive shaft and the shaft 22 will then become the driven shaft. Finally, if it is desired to have both shafts rotate in the same direction, an idler gear may be suitably interposed between the bevel gears 34 and 46.

After reading the foregoing detailed description, it should be obvious that the objects set forth at the outset of this specification have been successfully achieved. Accordingly,

What is claimed is:

1. A gear reducer assembly comprising a housing, first shafts means in said housing disposed along a first longitudinally extending axis, first gear means supported on said first shaft means within said housing, a second shaft means in said housing disposed along a second inclined axis defining an acute angle between said first axis and said second axis, gear means on said second shaft means engaging said first gear means, bearing means mounted in said housing for rotatably supporting said first and second shaft means, said bearing means including a pair of bearing members spaced apart along each shaft and having the gear means on that shaft disposed between them, each of said bearing members being a spherical self-aligning bearing, and spring means for maintaining said bearing means in position within said housing.

2. In a gear assembly including housing means having a shaft carrying at least one gear thereon, the improvement which comprises:
 (a) spherically contoured bearing sockets disposed in said housing in spaced apart relation to one another;
 (b) spherically contoured bearing members disposed in said sockets and rotatably mounting said shaft within said housing;
 (c) said bearing members and said sockets cooperating to provide self-aligning bearing means for said shaft; and,
 (d) independent biasing means separately associated with each bearing member to yieldably urge the same into said sockets.

3. The improvement defined in claim 2 wherein said housing includes recesses for receiving said biasing means, and wherein said biasing means comprise coil springs.

4. The improvement defined in claim 2 wherein said bearing members are fixed to said shaft.

References Cited by the Examiner

UNITED STATES PATENTS

| | | | |
|---|---|---|---|
| 1,548,917 | 8/1925 | Vincent | 74—417 |
| 2,450,734 | 10/1948 | Majewski | 74—417 |
| 2,995,946 | 8/1961 | Harvey | 308—72 |

DAVID J. WILLIAMOWSKY, *Primary Examiner.*

DON A. WAITE, *Examiner.*

R. J. BIRD, H. S. LAYTON, *Assistant Examiners.*